(12) United States Patent
Ieoka

(10) Patent No.: US 6,784,633 B2
(45) Date of Patent: Aug. 31, 2004

(54) METHOD AND APPARATUS FOR CONTROLLING SWITCHED RELUCTANCE MOTOR AND COMPRESSOR

(75) Inventor: Shoichi Ieoka, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 147 days.

(21) Appl. No.: 10/262,004

(22) Filed: Oct. 1, 2002

(65) Prior Publication Data

US 2003/0062869 A1 Apr. 3, 2003

(30) Foreign Application Priority Data

Oct. 2, 2001 (JP) ......................................... 2001-306284

(51) Int. Cl.[7] ............................................... H02P 1/46
(52) U.S. Cl. ....................... 318/701; 318/254; 318/138; 318/439
(58) Field of Search .................................. 318/701, 254, 318/138, 439, 804, 798, 811

(56) References Cited

U.S. PATENT DOCUMENTS

| | | | |
|---|---|---|---|
| 6,008,563 A | 12/1999 | Baba et al. ................. | 310/254 |
| 6,181,092 B1 * | 1/2001 | Turner ........................ | 318/254 |
| 6,359,413 B1 * | 3/2002 | Schulz et al. ............... | 318/701 |

FOREIGN PATENT DOCUMENTS

| | | | |
|---|---|---|---|
| JP | 9-252588 | 9/1997 | ............. H02P/5/05 |
| JP | 9-324668 | 12/1997 | ........... F02D/29/02 |
| JP | 11-136897 | 5/1999 | ............ H02K/3/52 |
| JP | 11-206181 | 7/1999 | ............. H02P/5/05 |
| JP | 11-275890 | 10/1999 | ............. H02P/7/05 |
| JP | 2001-128477 | 5/2001 | ............. H02P/5/05 |

OTHER PUBLICATIONS

*The Transactions of the Institute of Electrical Engineers of Japan D* (T.IEE Japan, vol. 120–D, No. 6, 2000, pp. 795–801).

* cited by examiner

*Primary Examiner*—Karen Masih
(74) *Attorney, Agent, or Firm*—Morgan & Finnegan, LLP

(57) ABSTRACT

A method for controlling a switched reluctance motor includes controlling an applied voltage to supply constant current to each of the coils of the switched reluctance motor in order of rotation; and determining a switching timing for switching the phases of the coils such that the switching to an exited phase occurs when the variation amount of the applied voltage to the coil having the exited phase is substantially zero.

17 Claims, 4 Drawing Sheets

Inverter Controlling Device

METHOD AND APPARATUS FOR CONTROLLING SWITCHED RELUCTANCE MOTOR AND COMPRESSOR

BACKGROUND OF THE INVENTION

The present invention relates to a method and an apparatus for controlling a switched reluctance motor (hereinafter, referred to as an SR motor) and to a compressor that employs the SR motor, which is controlled by the controlling apparatus.

Compared to a conventional alternating motor, an SR motor is smaller and has a simpler structure, which contributes to a reduction in costs. The current or voltage of the SR motor needs to be controlled in accordance with the position of a rotor due to the principle of torque generation. Therefore, an optical or magnetic positioning sensor for the rotor is generally located on a motor axis of the SR motor. However, if the positioning sensor is located on the SR motor, the size of the system that is equipped with the SR motor is increased and the reliability is decreased. Also, the installation requirements of the system having the SR motor restrict the installation position. This spoils the advantages of the SR motor.

Therefore, a method and an apparatus for controlling the SR motor without providing a positioning sensor on the SR motor have been developed. In this method and apparatus, the SR motor is controlled by estimating the position of the rotor. FIG. 5 is a graph showing the magnetizing properties of the SR motor. FIG. 5 shows a one-to-one relationship between the magnetic flux linkage $\lambda$ and the coil current i for each rotor position $\theta$ (the rotor position $\theta$ is 90 degrees at an aligned position, the rotor position $\theta$ is 45 degrees at a nonaligned position).

It is considered that the position of the rotor can be estimated based on the magnetizing properties. For example, The Transactions of the Institute of Electrical Engineers of Japan D (June, 2000 Publication No. 795-801) focuses on the fact that each rotor position has a one-to-one relationship with the coil current and the magnetic flux linkage of one phase. The above publication discloses a simplified equation of the magnetizing properties for estimating the position of the rotor and proposes an algorithm of position estimation based on the equation.

More specifically, the above publication discloses a simple equation, which describes the magnetic flux linkage $\lambda$ by the coil current i and the rotor position $\theta$ based on the following basic equation (1), which describes the magnetic flux linkage $\lambda(t)$. Thus, the rotor position is estimated using the coil current i and the magnetic flux linkage $\lambda$.

$$\lambda(t)=\int \{Vph(t)-R\cdot i(t)\}dt \qquad (1)$$

In the above equation, Vph(t) represents the applied voltage to the coil, R represents the coil resistance, and i(t) represents the coil current.

Japanese Laid-Open Patent Publication No. 2001-128477 discloses a controller in which an inverter supplies pulse voltage or current to a stator coil of each phase of an SR motor, thereby actuating the SR motor. The controller includes reference signal generating means, which generates a reference signal regardless of the position of a rotor of the SR motor, and rotational speed detector, which detects the rotational speed of the rotor without using the reference signal. Based on the generated reference signal and the detected rotational speed, the controller controls the inverter by inverter controlling means to set the phase of pulse voltage or current such that a forward torque is generated. The rotational speed detector also has a detector for detecting the magnetic flux linkage $\lambda$.

However, even though a simple equation is used in the position estimating algorithm of the former method, the calculation for estimating the rotor position $\theta$ is complicated. Thus, it is required to use a high-performance CPU or a digital signal processor (DSP), which increases the cost.

In the controller of the publication No. 2001-128477, in addition to the reference signal generating means, which generates a reference signal regardless of the position of the rotor of the SR motor, the rotational speed detector, which detects the rotational speed without using the reference signal, is required. This complicates the structure of the controller and increases the load on the CPU. As a result, a high-performance CPU is required.

Recently, a system (idling stop system), which automatically stops an engine when a vehicle temporarily stops at stoplights while traveling on urban loads and restarts an engine under a predetermined condition, has been developed to reduce the exhaust gas and economize on fuel. An actuator for such vehicle equipment is disclosed in, for example, Japanese Laid-Open Patent Publication No. 9-324668. The actuator actuates a compressor, which is located in a refrigeration circuit of a vehicular air-conditioner, by the power from an engine when the engine is running. When the engine is stopped, the compressor is actuated by a motor. The motor, which is mounted on the compressor of the vehicular air-conditioner, is actuated at a relatively low speed (less than or equal to 1000 rpm) and at a constant torque when it is actuated during idling stop of the engine. Thus, when SR motors are used for such motor, the rotational speed need not be detected accurately. Thus, it is only required that the phases be switched such that the motor is reliably driven by a forward torque.

SUMMARY OF THE INVENTION

Accordingly, it is an objective of the present invention to provide a method and an apparatus for controlling an SR motor that has a simple structure and reduces the load on a CPU and that is suitable for a case in which a motor is driven at a relatively low speed and at a constant torque. The present invention further provides a compressor that employs the SR motor that is driven by the above control method.

To achieve the above objective, the present invention provides a method for controlling a switched reluctance motor. The switched reluctance motor has a plurality of coils. Each of the coils cycles through a cycle of phases including an excited phase. The method includes: controlling an applied voltage to supply constant current to each of the coils of the switched reluctance motor in order of rotation; and determining a switching timing for switching the phases of the coils such that the switch to the exited phase occurs when the variation amount of the applied voltage to the coil having the exited phase is substantially zero.

The present invention also provides a controller located in a switched reluctance motor having a plurality of phases. The switched reluctance motor has a plurality of coils. Each of the coils cycles through a cycle of phases including an excited phase. The controller has a first detector, a second detector, an inverter and an inverter controlling device. The first detector detects the current supplied to the coils. The second detector detects the voltage applied to the coils. The inverter generates the current supplied to the coils. The inverter controlling device controls the inverter such that the current value is constant. The inverter controlling device controls the inverter to switch the excited phases when the applied voltage is less than or equal to a predetermined value that is determined based on the product of the resistance of the coil corresponding to the applied voltage and the current value detected by the first detector.

The present invention also provides a compressor including a switched reluctance motor having a plurality of phases. The switched reluctance motor has a plurality of coils. Each of the coils cycles through a cycle of phases including an excited phase. The switched reluctance motor includes a controller. The controller has a first detector, a second detector, an inverter and an inverter controlling device. The first detector detects the current supplied to the coils. The second detector detects the voltage applied to the coils. The inverter generates the current supplied to the coils. The inverter controlling device controls the inverter such that the current value is constant. The inverter controlling device controls the inverter to switch the excited phases when the applied voltage is less than or equal to a predetermined value that is determined based on the product of the resistance of the coil corresponding to the applied voltage and the current value detected by the first detector.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A compressor according to a preferred embodiment will now be described with reference to FIGS. 1 to 5. The compressor constitutes a part of a refrigeration circuit of a vehicular air-conditioner.

Figure 1:
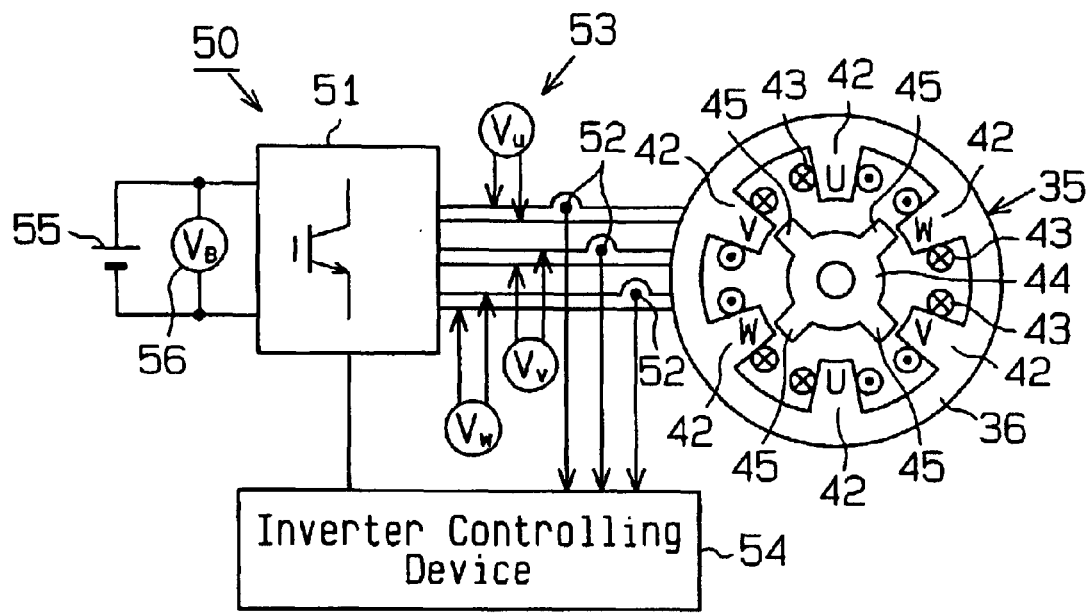
FIG. 1 is a block diagram illustrating the structure of a controller for an SR motor according to a preferred embodiment of the present invention.
Figure 3:
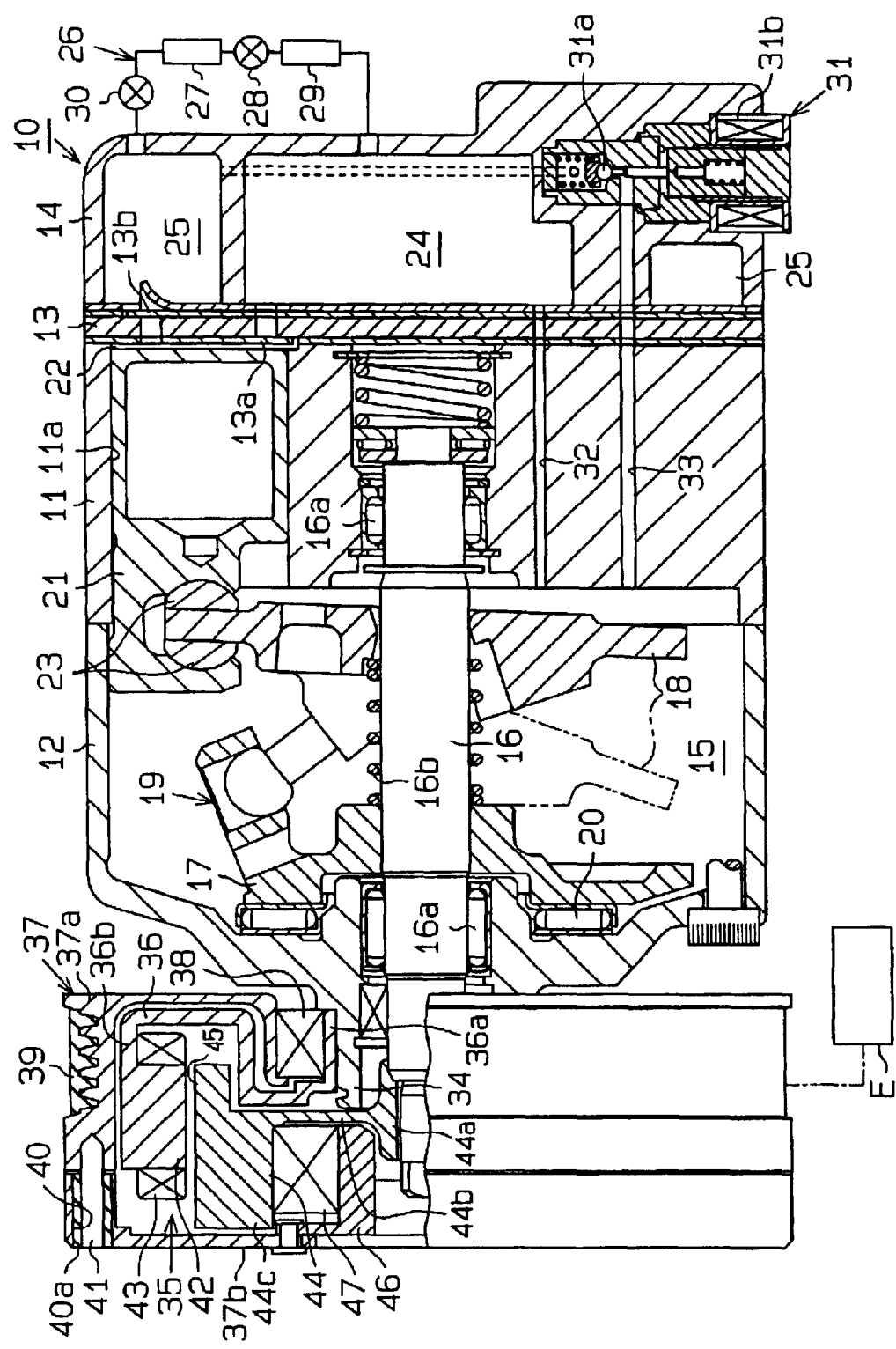
FIG. 3 is a cross-sectional view illustrating a compressor that employs the SR motor.

FIG. 1 is a block diagram showing the structure of a controller for an SR motor, which is located in the compressor. FIG. 3 is a cross-sectional view of the compressor. The left end (where the pulley is located) of the compressor in FIG. 3 is defined as the front of the compressor.

As shown in FIG. 3, the compressor 10 includes a cylinder block 11, a front housing member 12, which is secured to the front end of the cylinder block 11, and a rear housing member 14, which is secured to the rear end of the cylinder block 11. A valve plate assembly 13 is located between the front housing member 12 and the rear housing member 14. The front and rear housing members 12, 14 and the cylinder block 11 are secured to each other with bolts. The cylinder block 11 and the front housing member 12 define a crank chamber 15.

A drive shaft 16 extends through the crank chamber 15 and is rotatably supported by the front housing member 12 and the cylinder block 11 with a radial bearing 16a. A lug plate 17, which is fixed to the drive shaft 16, a cam plate, which is a swash plate 18 in this embodiment, and a hinge mechanism 19, which is located between the lug plate 17 and the swash plate 18, are accommodated in the crank chamber 15. A thrust bearing 20 is located between the lug plate 17 and the inner surface of the front housing member 12. The swash plate 18 slides along and inclines with respect to the axial direction of the drive shaft 16. The lug plate 17 and the hinge mechanism 19 permit the swash plate 18 to rotate integrally with the drive shaft 16.

The cylinder block 11 has cylinder bores 11a (only one shown), which are arranged at equal angular intervals about the drive shaft 16. Each cylinder bore 11a accommodates a single-headed piston 21. Each piston 21 reciprocates inside the corresponding cylinder bore 11a. A compression chamber 22 is defined in each cylinder bore 11a between the end surface of the corresponding piston 21 and the valve plate assembly 13. Each piston 21 is coupled to the peripheral portion of the swash plate 18 by a pair of shoes 23. The hinge mechanism 19, the swash plate 18, and the shoes 23 convert the rotation of the drive shaft 16 to reciprocation of the pistons 21.

The rear housing member 14 defines a suction chamber 24 and a substantially annular discharge chamber 25, which surrounds the suction chamber 24. The suction chamber 24 is connected to the discharge chamber 25 by an external refrigerant circuit 26. The valve plate assembly 13 has suction ports and discharge ports. Each set of the suction port and the discharge port corresponds to one of the compression chambers 22. Each suction port has a suction valve flap 13a and each discharge port has a discharge valve flap 13b. Refrigerant gas in the suction chamber 24 is drawn into each compression chamber 22 in accordance with the suction performance of the corresponding piston 21. The refrigerant gas drawn into each compression chamber 22 is compressed in accordance with the compression performance of the corresponding piston 21 and then discharged to the discharge chamber 25.

The external refrigerant circuit 26 includes a condenser 27, a decompression device, which is an expansion valve 28 in this embodiment, and an evaporator 29. A shutoff valve 30 is located in the refrigerant passage between the discharge chamber 25 and the condenser 27 of the external refrigerant circuit 26. The shutoff valve 30 disconnects the refrigerant passage when the pressure in the discharge chamber 25 is lower than a predetermined value to stop the circulation of refrigerant via the external refrigerant circuit 26.

In the compressor 10, the inclination angle of the swash plate 18 can be adjusted to any angle between the maximum inclination angle and the minimum inclination angle (the state shown in FIG. 3), which is close to zero, by controlling the pressure in the crank chamber 15 using an electromagnetic control valve. The inclination angle is the angle between the swash plate 18 and a surface that is perpendicular to the drive shaft 16.

An electromagnetic control valve 31 is located in the rear housing member 14. The swash plate 18 is urged toward the cylinder block 11 (in the direction to reduce the inclination angle) by a spring 16b located between the lug plate 17, which is located on the drive shaft 16, and the swash plate 18.

The crank chamber 15 is connected to the suction chamber 24 by a bleed passage 32. The discharge chamber 25 is connected to the crank chamber 15 by a supply passage 33. The electromagnetic control valve 31 is located in the supply passage 33. The electromagnetic control valve 31 includes a solenoid 31b and a valve body 31a. The position of the valve body 31a, or the opening degree of the valve body 31a, is changed in accordance with the external power supply to the solenoid 31b. Controlling the opening degree of the valve body 31a adjusts the amount of pressurized gas discharged to the crank chamber 15 from the discharge chamber 25 through the supply passage 33. The pressure in the crank chamber 15 is determined by the balance between the discharged gas and the amount of gas introduced into the suction chamber 24 from the crank chamber 15 through the bleed passage 32. The difference between the pressure in the crank chamber 15 and the pressure in the compression chambers 22 varies in accordance with the change in the pressure in the crank chamber 15. As a result, the stroke of the pistons 21, or the displacement of the compressor, is adjusted.

For example, when the opening degree of the electromagnetic control valve 31 is decreased, the pressure in the crank chamber 15 decreases. Thus, the difference between the pressure in the crank chamber 15 and the pressure in the compression chambers 22 decreases, which increases the inclination angle of the swash plate 18. This increases the displacement of the compressor 10. On the contrary, when the opening degree of the electromagnetic control valve 31 is increased, the pressure in the crank chamber 15 increases. Thus, the difference between the pressure in the crank chamber 15 and the pressure in the compression chambers 22 increases, which decreases the inclination angle of the swash plate 18. This reduces the displacement of the compressor 10.

A controlling means, which is not shown, receives external information (on-off state of the air conditioner, the temperature of the passenger compartment, and a target temperature) from the external detector, which is not shown. Based on the received information, the controlling means commands a drive circuit to supply current to the solenoid 31b. Controlling the amount of current supplied to the solenoid 31b adjusts the opening degree of the electromagnetic control valve 31.

When the displacement of the compressor 10 is minimized, the pressure in the discharge chamber 25 is less than a predetermined value. Thus, the shutoff valve 30 is closed to prevent refrigerant gas from being discharged to the external refrigerant circuit 26. Since the minimum inclination angle of the swash plate 18 is not zero, even when the displacement of the compressor 10 is minimized, refrigerant gas is still drawn into the cylinder bores 11a from the suction chamber 24 and compressed. The compressed refrigerant is then discharged from the cylinder bores 11a to the discharge chamber 25. Therefore, even when the compressor 10 is driven at the minimum displacement, a refrigerant circuit is formed in the compressor 10. In the refrigerant circuit, refrigerant flows through the cylinder bores 11a, the discharge chamber 25, the supply passage 33, the crank chamber 15, the bleed passage 32, the suction chamber 24, and back to the cylinder bores 11a. Therefore, lubricant is circulated in the internal refrigerant circuit with refrigerant.

A power transmission mechanism and the SR motor will now be described. The power transmission mechanism transmits rotation of a vehicular engine E to the drive shaft 16. The SR motor drives the drive shaft 16 while the engine E is stopped.

A cylindrical portion 34 is formed to project from the front end of the front housing member 12. A stator 36 of the SR motor 35 is fitted to the outer circumference of the cylindrical portion 34 with a cylindrical portion 36a, which is formed at the center of the stator 36. A pulley 37, which forms the power transmitting mechanism, is rotatably supported by the outer circumference of the cylindrical portion 36a with a bearing 38. The pulley 37 is coupled to the engine E of the vehicle with a belt 39.

The pulley 37 includes a main body 37a for accommodating the SR motor 35 and a lid 37b for covering the accommodating space defined in the main body 37a. The belt 39 is wound about the main body 37a. Bores 40 are formed on the periphery of the lid 37b. Each bore 40 accommodates a dumper 40a, which is made of a flexible member. The lid 37b is secured to the main body 37a by pins 41, each of which is inserted through one of the dumpers 40a. The lid 37b rotates integrally with the main body 37a.

Figure 2A:
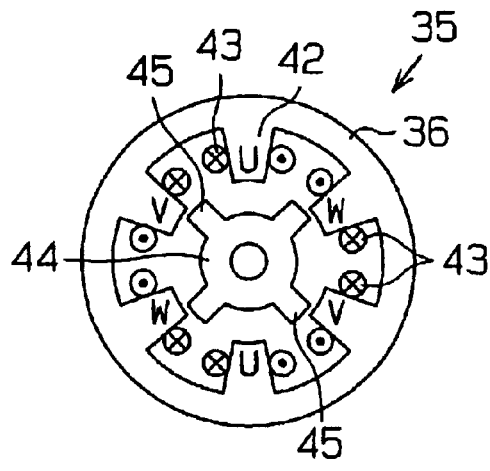
FIG. 2(a) is a schematic diagram illustrating a rotor, which is located in the SR motor shown in FIG. 1, when the rotor is at a nonaligned position.
Figure 2B:
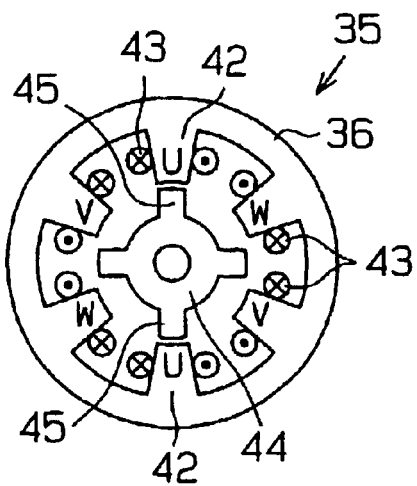
FIG. 2(b) is a schematic diagram illustrating the rotor, which is located in the SR motor shown in FIG. 1, when the rotor is at an aligned position.

The stator 36 has an annular support 36b, which is formed along the inner surface of the main body 37a. Projecting poles 42, the number of which is 3N (N is a natural number and N equals to two in this embodiment), are formed at equal intervals (equal pitches) on the inner surface of the main body 37a that correspond to the portion about which the belt is wound. The projecting poles 42 are supported by the cylindrical portion 34 with the support 36b. A coil 43 is wound about each projecting pole 42. In this embodiment, each coil 43 forms a pair with the opposing one of the coils 43. That is, there are three pairs of the coils 43 as shown in FIGS. 1 to 2(b). Three-phase alternating currents are supplied to the pairs of the coils 43.

A rotor 44 of the SR motor 35 is secured to the distal end of the drive shaft 16. The rotor 44 rotates integrally with the drive shaft 16. The rotor 44 has a boss 44a and a flange 44b, which is formed on the outer side of the boss 44a. An annular portion 44c is formed on the periphery of the flange 44b. Projecting poles 45 of the rotor 44 are formed on the annular portion 44c. The projecting poles 45, the number of which is 2N (N equals to two in this embodiment), are formed at predetermined equal intervals on the outer circumferential surface of the annular portion 44c.

That is, the SR motor 35 includes the cylindrical stator 36, which has six projecting poles 42, and the rotor 44, which has four projecting poles 45, arranged inside the stator 36.

A cylindrical portion 46 is located at the center of the lid 37b. A one-way clutch 47 is located between the cylindrical portion 46 and the annular portion 44c. When the cylindrical portion 46 is rotated in a predetermined direction by the engine E, the one-way clutch 47 transmits the rotation of the cylindrical portion 46 to the annular portion 44c. When the annular portion 44c is rotated, the one-way clutch 47 prevents the rotation of the annular portion 44c from being transmitted to the cylindrical portion 46. Since the one-way clutch 47 is located in the SR motor 35, the rotation of the pulley 37 is transmitted to the drive shaft 16 by the rotor 44 when the engine E is running, and the rotation of the rotor 44 is not transmitted to the pulley 37 when the engine E is stopped and the SR motor 35 is actuated.

The structure of a controller 50 for the SR motor 35 will now be described with reference to FIG. 1. The controller 50 includes an inverter 51, a first detector, which is a current detector 52 in this embodiment, a second detector, which is an applied voltage detector 53, and an inverter controlling device 54. The inverter 51 receives direct current voltage from a battery 55 and supplies required currents to the coils 43 of each phase (U-phase, V-phase, W-phase) of the SR motor 35 in order of rotation. Each coil 43 cycles through the cycle of phases including an excited phase. The current detector 52 detects the value of the current flowing through each pair of the coils 43 of each phase. The applied voltage detector 53 detects the voltage value applied to each pair of the coils 43 of each phase. Detection signals are sent to the inverter controlling device 54 from the current detector 52 and the applied voltage detector 53. The inverter controlling device 54 includes a microcomputer. The microcomputer controls the inverter 51 to generate currents of three phases that are displaced by 120 electrical degrees such that the current values are maintained at a predetermined steady value. The inverter controlling device 54 also controls the inverter 51 to switch the phases at the predetermined timing. The switching timing of each phase is determined based on a point where the variation amount of the applied voltage to the coils 43 of each phase is zero.

Suppose that the magnetic flux linkage $\lambda$ (t) can be obtained by the following equation (1). When the rotor 44 is rotated and thus the inductance is changed, the rotor 44 moves from a nonaligned position as shown in FIG. 2(a) to an aligned position as shown in FIG. 2(b). In this case, the magnetic flux linkage $\lambda$ (t) stops changing at the aligned position. That is, the value of $\{V(t)-R \cdot i(t)\}$ in the equation (1) is zero.

$$\lambda(t) = \int \{V(t) - R \cdot i(t)\} dt \quad (1)$$

In the above equation, V(t) represents the applied voltage to the coil, R represents the coil resistance (including the resistance of wiring to the coil 43 and the inverter 51), i(t) represents the coil current.

That is, if the phase is switched when the value of V(t) is equal to the value of R·i(t), or the variation amount of the applied voltage is zero, the phase is switched at the aligned position. If the phase is switched when the value of V(t) is equal to R·i(t)+α(α>0), the phase is switched in an earlier stage before the projecting poles 45 reaches the aligned position.

Figure 4:
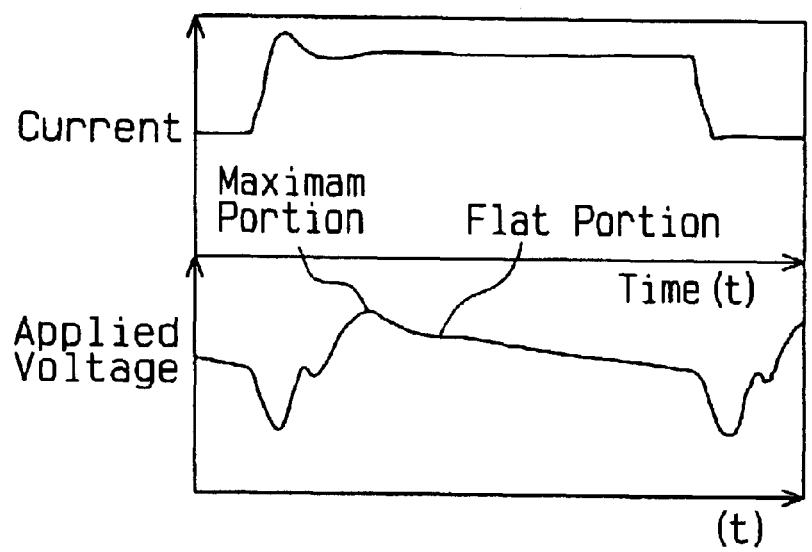
FIG. 4 is a graph showing the relationship between the current flowing through a coil and the applied voltage.
Figure 5:
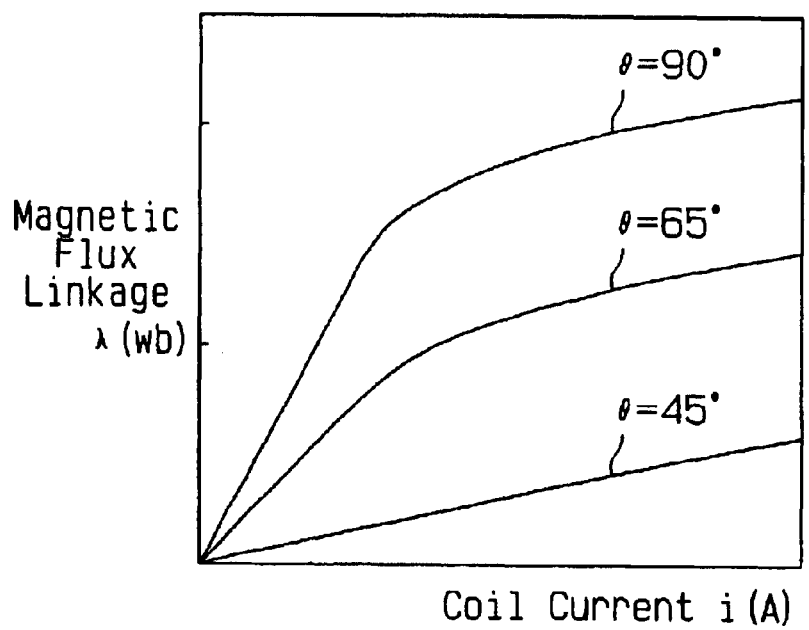
FIG. 5 is a graph showing the relationship between the coil current and the magnetic flux linkage of the SR motor.

FIG. 4 shows the relationship between the current and the applied voltage when square wave current is applied to the SR motor 35 and the rotor 44 is rotated. After reaching the maximum value of a cycle of the voltage that fluctuates in a predetermined cycle, the applied voltage decreases as time elapses. When the applied voltage decreases, the line representing the applied voltage temporarily becomes flat (flat portion), that is, the variation amount of the applied voltage becomes zero. The flat portion corresponds to the aligned position. From the experimental result, it is clear that the portion where the variation amount of the applied voltage becomes zero depends on the current but is independent of the rotational speed of the rotor 44.

The torque generated by the SR motor 35 is effectively used by switching the phases at an early stage by comparing the above result to a case in which the phases are switched when the projecting poles 45 are at the aligned position. Thus, in the preferred embodiment, the phases are switched at an early stage. More specifically, a predetermined applied voltage at which the inverter controlling device 54 switches the phases are set to values greater than the product of the coil resistance R and the coil current i. The predetermined applied voltage is determined by executing an experiment. First, the applied voltage, which is equal to the product of the coil resistance R and the coil current i, is obtained. Then, the predetermined applied voltage is set to a value that is greater than the obtained value and that corresponds to a point where the torque applied to the rotor 44 does not decrease when the phase is switched. The inverter controlling device 54 stores the predetermined applied voltage corresponding to each different current value in a memory (not shown).

The predetermined voltage is accurately set corresponding to the current value if the coil resistance R is constant. However, the predetermined voltage is affected by the rotational speed of the rotor 44 and the voltage loss of the inverter 51. Further, the predetermined voltage is greatly affected by a change in the rotational speed at the start of operation. Therefore, in the preferred embodiment, the predetermined voltage is determined in accordance with the voltage value based on the current that flows through the coil 43 and a correction voltage. The correction voltage is the sum of the correction voltage for the rotational speed of the rotor 44 and the correction voltage for the voltage loss of the inverter 51. That is, assuming that Vr represents the predetermined value, Vi represents the voltage value based on current, and Vc represents the correction voltage, the predetermined voltage is obtained using the following equation.

$$Vr = Vi + Vc$$

The operation of the compressor 10 will now be described. The compressor 10 is driven by the engine E when the engine E is running. When the engine E is stopped, the compressor 10 is driven by the SR motor 35.

When the engine E is running, the rotational force of the engine E is transmitted to the pulley 37 by the belt 39. The rotation of the pulley 37 is transmitted to the rotor 44 by the one-way clutch 47. The drive shaft 16 is rotated integrally with the rotor 44. When the drive shaft 16 is rotated, the swash plate 18 is rotated with the drive shaft 16. The rotation of the swash plate 18 is converted to reciprocation of each piston 21 via the corresponding shoe 23. Each piston 21 reciprocates by a stroke corresponding to the inclination angle of the swash plate 18. Accordingly, refrigerant gas is drawn into each compression chamber 22 from the suction chamber 24. Then, the refrigerant gas is compressed in each compression chamber 22 by the movement of the corresponding piston 21 and discharged to the discharge chamber 25 through the corresponding discharge port. The refrigerant discharged to the discharge chamber 25 is sent to the external refrigerant circuit 26 through a discharge bore.

The opening degree of the electromagnetic control valve 31 is adjusted in accordance with the refrigeration load to change the communicating state of the discharge chamber 25 and the crank chamber 15. When the refrigeration load is high and the pressure in the suction chamber 24 is high, the opening degree of the electromagnetic control valve 31 is controlled to be decreased. When the opening degree of the electromagnetic control valve 31 is decreased, the pressure in the crank chamber 15 (crank pressure Pc) is decreased, which increases the inclination angle of the swash plate 18. Therefore, the stroke distance of each piston 21 is increased. Thus, the compressor 10 is driven with the volume of the cylinder bores 11a located inside the compressor 10 being large. When the refrigeration load is low and the pressure in the suction chamber 24 is low, the opening degree of the electromagnetic control valve 31 is controlled to be increased. When the opening degree of the electromagnetic control valve 31 is increased, the crank pressure Pc is increased, which decreases the inclination angle of the swash plate 18. Therefore, the stroke distance of each piston 21 is decreased. Thus, the compressor 10 is driven with the volume of the cylinder bores 11a located inside the compressor 10 being small.

When the vehicle is in the idling stop mode, or when the compressor 10 needs to be driven while the engine E is stopped, the compressor 10 is actuated by the SR motor 35. The controller 50 controls the SR motor 35 to be driven by a constant current. The current is supplied to three phases (U-phase, V-phase, W-phase) in order of rotation. Based on a command sent from the inverter controlling device 54, the inverter 51 supplies currents of the three phases, which are apart by 120 electrical degrees, to the pairs of the coils 43. Further, the inverter 51 adjusts the applied voltage to the coils 43 of each phase, or the output voltage, such that a predetermined value of current is supplied to the coils 43 of each phase.

The current value of current flowing through each pair of the coils 43 detected by the current detector 52 corresponds to a detection signal. The detection signal is detected by the current detector 52. The detection signal is sent to the inverter controlling device 54. The applied voltage to the coils 43 of each phase also corresponds to the detection signal. The applied voltage is detected by the applied voltage detector 53. The detection signal is sent to the inverter controlling device 54. Based on the detection signal detected by the current detector 52, the inverter controlling device 54 sends a command signal to the inverter 51 such that the current value of the coils 43 of each phase is maintained at the predetermined value. When the detected value of the applied voltage is less than or equal to the predetermined voltage that corresponds to the current value and the rotational speed of the rotor 44 after a predetermined time has elapsed from when the phase is switched, or after the maximum value of the applied voltage has been detected, the phase is switched by the command from the inverter controlling device 54.

The SR motor used for driving the compressor 10 during the idling stop of the vehicle is driven at a constant torque at relatively low speed (less than or equal to 1000 rpm). Therefore, when driving such SR motor 35, the rotational speed of the SR motor 35 need not be obtained accurately. That is, it is only required that the phase is switched such that the SR motor 35 is driven by a forward torque. This requirement is satisfied by switching the phases when a forward torque is applied to the SR motor 35 while or before the rotor 44 is positioned at the aligned position.

The present invention provides the following advantages.

(1) Since the SR motor 35 is controlled by a constant current drive, a desired torque is obtained when actuating the compressor 10, which is driven by the SR motor 35. Therefore, the SR motor 35 is easily driven as compared to a case in which the SR motor 35 is controlled by a constant voltage drive.

(2) The switching timing of each phase is determined based on a point where the variation amount of the applied voltage to the coils 43 of each phase is zero. The phase is switched at the determined phase switching timing. Thus, the magnetic flux linkage λ need not be obtained as in the prior art. As a result, the simplified structure reduces the load on the CPU and the switching timing of each phase is easily determined. Thus, the SR motor 35 is smoothly driven.

(3) The switching timing of each phase is set to a point where the applied voltage is less than or equal to the predetermined voltage, which is set corresponding to the current value for the constant current drive, under a predetermined condition. Therefore, the variation amount of the applied voltage need not be computed and the inverter controlling device 54 more easily determine the phase switching timing compared to the prior art.

(4) The switching timing of each phase is set to a point before the variation amount of the applied voltage is zero and where the forward torque is applied to the rotor 44 when current is supplied to the next phase. Therefore, as compared to a case where the phase is switched when the projecting poles 45 are at the aligned position, the torque is efficiently applied to the rotor 44 and the driving efficiency of the SR motor 35 is improved.

(5) The predetermined voltage is the sum of the voltage based on the current flowing through the coils 43 and the correction voltage. Therefore, the predetermined voltage is determined not only in accordance with the voltage value based on the current flowing through the coils 43 but also taking into consideration of the correction voltage, which varies in accordance with the condition of the SR motor 35 (such as temperature, load, and rotational speed). Thus, the phase switching timing is determined with high accuracy.

(6) The predetermined voltage is set in accordance with the voltage value based on the currents that is supplied to the coils 43, the correction voltage based on the rotational speed of the rotor 44, and the correction voltage due to the voltage loss of the inverter 51. Therefore, the predetermined voltage is determined using the correction voltage in which the condition of the SR motor 35 is reflected. Thus, the phase switching timing is determined with improved accurately.

(7) The SR motor 35 is used as a drive motor of the compressor 10. The SR motor 35 is controlled by the controller 50 without employing a position sensor for the rotor. Thus, the advantage of the SR motor 35, which is small in size and has a simple structure, is effective and the compressor 10 is further minimized.

(8) The SR motor 35 is arranged in the pulley 37, which transmits power supplied from the engine E of the vehicle to the drive shaft 16 of the compressor 10. Therefore, as compared to the prior art compressor, in which the SR motor 35 is arranged on the out side of the pulley 37, the size of the compressor 10 is minimized.

(9) The compressor 10 is a variable displacement compressor, which maintains the constant rotational speed of the drive shaft 16 and varies the displacement. Therefore, the displacement of the compressor 10 is varied in accordance with the cooling load without changing the rotational speed of the SR motor 35, which drives the drive shaft 16. This facilitates the control of the SR motor 35.

(10) The compressor 10 is a swash plate type variable displacement compressor, which varies the displacement by changing the inclination angle of the swash plate 18 with respect to the drive shaft 16. Therefore, the displacement is changed without wasting the driving energy of the SR motor 35.

It should be apparent to those skilled in the art that the present invention may be embodied in many other specific forms without departing from the spirit or scope of the invention. Particularly, it should be understood that the invention may be embodied in the following forms.

In the preferred embodiment, the predetermined voltage representing the switching timing of each phase is determined in accordance with the voltage value based on the current supplied to the coils 43 and the correction voltage. In addition, the correction voltage, which takes into consideration of the temperature, may be used. In this case, the accuracy of the phase switching timing is improved.

The predetermined voltage representing the switching timing of each phase may be determined using only the voltage value based on the current supplied to the coil 43. In this case, however, it is difficult to determine the phase switching timing accurately when the rotational speed varies greatly at the start of the SR motor 35.

The predetermined value representing the switching timing of each phase may be set to a voltage value at a point where the variation amount of the applied voltage is zero, that is, a point where the value is equal to a product of the coil resistance and the coil current. In this case, the phase of the SR motor 35 is switched at a point where the projecting poles 42 of the stator 36 and the projecting poles 45 of the rotor 44 of the phase to which current is supplied are at the aligned position. As a result, the phases are switched without generating a reverse torque.

In the preferred embodiment, to switch each phase at a point where the variation amount of the applied voltage is zero, the predetermined voltage corresponding to the point is determined in advance. However, the variation amount of the applied voltage may be computed each time. Then, each phase may be switched if the computed value is zero. In this case, the phases are switched in a suitable manner even when the cooling load is changed or the rotational speed of the rotor 44 is changed. Also, a temperature sensor is not required since the temperature changes need not be detected to correct the predetermined voltage.

Even when the applied voltage has not reached the predetermined value, the phase may be switched when a predetermined time has elapsed from when the phase is switched before. In this case, even when a correct applied voltage is not detected for some reasons, a reverse torque is prevented from being applied to the rotor due to a delay in the switching timing of each phase. This suppresses a reduction in the rotational efficiency of the SR motor.

An abnormality signal may be sent out to stop the SR motor if the number of times the phase is switched when the applied voltage is less than the predetermined value is more than or equal to a predetermined number. In this case, the problem caused by operating the SR motor in an abnormal state for a long time is prevented from spreading.

In the preferred embodiment, the current detector 52 starts to detect voltage for comparing the applied voltage to the predetermined voltage when the predetermined time has elapsed from when the current is supplied to the corresponding phase. However, the current detector 52 may start to take samples of detection data when the applied voltage is greater than the maximum value.

If the time elapsed from when the current is supplied to the corresponding phase is shorter than a predetermined time when the applied voltage is less than or equal to the predetermined value, the phase may not be switched at the point. Instead, the phase may be switched after the predetermined time has elapsed.

The number of the projecting poles 42 of the stator 36 need not be six. The number of the projecting poles 42 may be any number such as three, nine, twelve, fifteen, or eighteen, as long as the number is equal to 3N (N is a natural number). The number of the projecting poles 45 also need not be four. The number of the projecting poles 45 of the rotor 44 may be greater than the number of the projecting poles 42 as long as the number is equal to 2N (N is a natural number). For example, the number of the projecting poles 45 may be eight when the number of projecting poles 42 is six.

The predetermined voltage may be stored in the memory as a function of the supplied current or a function of the supplied current and the rotational speed. In this case, the predetermined voltage is computed using each function in accordance with the condition of the SR motor 35.

Figure 6A:
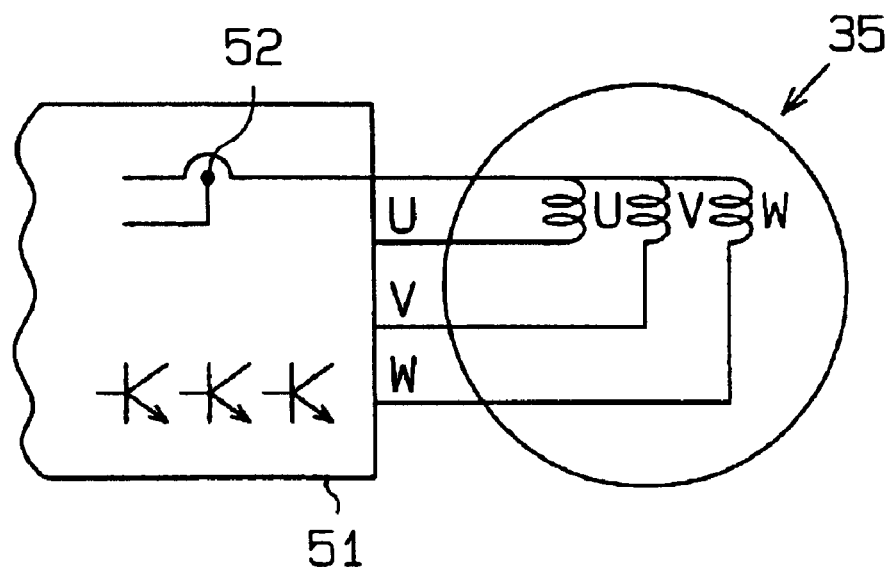
FIGS. 6(a) and 6(b) are schematic diagrams illustrating a further embodiment of the location of the current detector.
Figure 6B:
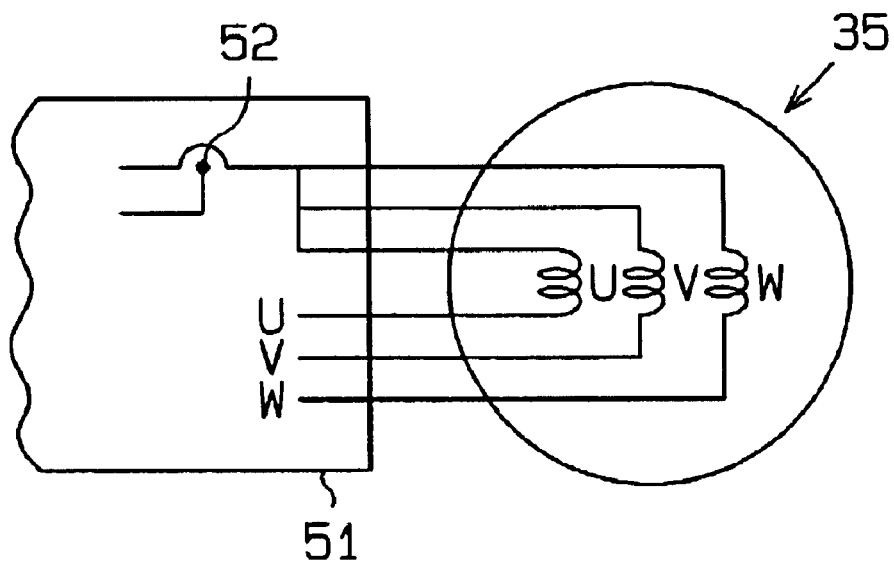

Instead of providing three current detectors 52, one current detector 52 may be located on the neutral point as shown in FIGS. 6(a) and 6(b).

The applied voltage detector 53 need not detect the voltage values of all the phases. Instead, a power source voltage detector 56 (shown in FIG. 1) may detect the voltage value of the power source, which is a battery 55. In this case, the inverter controlling device 54 obtains the applied voltage to the coil 43 of each phase using the voltage value detected by the power source voltage detector 56 and the output duty of the inverter 51. In this case, the applied voltage detector 53 is formed of the power source voltage detector 56 and the inverter controlling device 54. This simplifies the structure as compared to the structure in which the applied voltage detector 53 is provided for each phase.

The present invention is embodied in a compressor, in which the pistons are reciprocated by the rotation of the swash plate (cam plate). Instead, the present invention may be embodied in a wobble plate type compressor. In a wobble plate type compressor, when a drive shaft rotates, the wobble plate, which is coupled to pistons, wobbles without being rotated.

The present invention may be embodied in compressors other than a compressor, in which the displacement is variable while the drive shaft is rotated at a constant speed. For example, the present invention may be embodied in a compressor (such as a fixed swash plate type compressor), in which the displacement is constant while the drive shaft is rotated at a constant speed.

In the compressor according to the preferred embodiment, the SR motor 35 is incorporated in the pulley 37. However, the SR motor 35 may be arranged such that at least a part of the SR motor is incorporated in the pulley 37. The SR motor need not be incorporated in the pulley and may be arranged outside or inside the housing of the compressor.

The present invention may be embodied in compressors other than the swash plate type compressor. For example, the present invention may be embodied in a scroll compressor or a vane compressor.

The present invention may be embodied in compressors other than a compressor forming a part of a refrigeration circuit of a vehicular air conditioner. For example, the present invention may be embodied in a compressor for home electric appliances.

The SR motor may be embodied for purposes other than for driving a compressor. The SR motor may also be applied for purposes other than driving at a constant torque. For example, the SR motor may be used for a variable speed drive control.

Therefore, the present examples and embodiments are to be considered as illustrative and not restrictive and the invention is not to be limited to the details given herein, but may be modified within the scope and equivalence of the appended claims.

What is claimed is:

1. A method for controlling a switched reluctance motor having a plurality of coils, each of which cycles through a cycle of phases including an excited phase, the method comprising the steps of:
   controlling an applied voltage to supply constant current to each of the coils of the switched reluctance motor in order of rotation; and
   determining a switching timing for switching the phases of the coils such that the switch to the exited phase occurs when the variation amount of the applied voltage to the coil having the exited phase is substantially zero.

2. The controlling method according to claim 1, wherein, when a predetermined condition is satisfied, the switching timing is a point in time at which the applied voltage is less than or equal to a predetermined value that is determined in accordance with the current value for the constant current drive.

3. The controlling method according to claim 2, wherein the predetermined condition is satisfied after the applied voltage reaches the maximum value of a cycle of the voltage that fluctuates in a predetermined cycle.

4. The controlling method according to claim 2, wherein the predetermined value includes a correction voltage, which varies in accordance with the driving condition of the switched reluctance motor.

5. The controlling method according to claim 1, wherein the switching timing is determined to a point in time at which the variation amount of the applied voltage is zero.

6. The controlling method according to claim 1, wherein the switching timing is determined before the variation amount of the applied voltage becomes zero and when a forward torque is applied to a rotor of the switched reluctance motor by current supplied to the next coil.

7. A controller located in a switched reluctance motor having a plurality of phases, wherein the switched reluctance motor has a plurality of coils, each of which cycles through a cycle of phases including an excited phase, the controller comprising:

a first detector for detecting the current supplied to the coils;

a second detector for detecting the voltage applied to the coils;

an inverter for generating the current supplied to the coils; and an inverter controlling device, wherein the inverter controlling device controls the inverter such that the current value is constant, and wherein the inverter controlling device controls the inverter to switch the excited phases when the applied voltage is less than or equal to a predetermined value that is determined based on the product of the resistance of the coil corresponding to the applied voltage and the current value detected by the first detector.

8. Controller of claim 7 wherein the controller is used for a compressor.

9. The controller according to claim 7, wherein the predetermined value is the product of the resistance and the current.

10. The controller according to claim 7, wherein the predetermined value is greater than the product of the resistance and the current.

11. The controller according to claim 7, wherein the predetermined value includes a correction voltage, which varies in accordance with the driving condition of the switched reluctance motor.

12. The controller according to claim 11, wherein the switched reluctance motor includes a rotor, and wherein the correction voltage varies in accordance with the rotational speed of the rotor and the voltage loss of the inverter.

13. The controller according to claim 12, wherein the correction voltage is further varied in accordance with the temperature of the switched reluctance motor.

14. The controller according to claim 7, wherein the inverter controlling device switches the phases after a predetermined time has elapsed from the previous switching of phases.

15. A compressor including a switched reluctance motor having a plurality of phases, wherein the switched reluctance motor has a plurality of coils, each of which cycles through a cycle of phases including an excited phase, and wherein the switched reluctance motor includes a controller, the controller comprising:

a first detector for detecting the current supplied to the coils;

a second detector for detecting the voltage applied to the coils;

an inverter for generating the current supplied to the coils; and an inverter controlling device wherein the inverter controlling device controls the inverter such that the current value is constant, and wherein the inverter controlling device controls the inverter to switch the excited phases when the applied voltage is less than or equal to a predetermined value that is determined based on the product of the resistance of the coil corresponding to the applied voltage and the current value detected by the first detector, wherein the compressor forms a part of a refrigeration circuit of a vehicular air-conditioner, and wherein the switched reluctance motor is incorporated in a pulley, which transmits power from a vehicular engine to a drive shaft of the compressor.

16. The compressor according to claim 15, wherein the compressor is a variable displacement compressor that varies the displacement while the rotational speed of the drive shaft is constant.

17. The compressor according to claim 16, wherein the compressor includes a swash plate and varies the displacement in accordance with the inclination angle of the swash plate.

* * * * *